Patented Aug. 9, 1938

2,125,968

UNITED STATES PATENT OFFICE 2,125,968

MANUFACTURE OF AROMATIC ALCOHOLS

Ernst T. Theimer, East Orange, N. J.

No Drawing. Application August 21, 1935,
Serial No. 37,167

6 Claims. (Cl. 260—153)

This invention relates to the manufacture of aromatic alcohols and is particularly concerned with the manufacture of such alcohols by the Friedel-Crafts reaction, in which an alkylene oxide is condensed with a Friedel-Crafts reactant in the presence of an anhydrous metal halide.

The term "Friedel-Crafts reactant" as used in this specification designates any chemical compound which is capable of undergoing a mole for mole condensation with an alkylene oxide. Examples of such reactants are as follows: Any of the paraffin hydrocarbon series, for example, hexane, heptane, dodecane, octadecane, etc. Also, the cyclo-paraffins, for instance, cyclopentane and cyclohexane. Then the aromatic hydrocarbons, such as, benzol, toluol, cymene, naphthalene, etc., and also any of these hydrocarbons which have substituted chlorine or bromine atoms, for instance, monochlor benzene or monobrom benzene, or the like. Any of the aromatic ethers, such as anisole, phenetole, diphenyl ether, any aromatic aldehydes such as benzaldehyde, toluic aldehyde, any aromatic ketone such as acetophenone, benzophenone, may also be used. Any mixtures of these compounds are also suitable. They may occur naturally, or may be mixed artificially. For instance, gasoline or petroleum fractions or coal tar products, etc. may be used. Heterocyclic compounds such as pyridine, quinoline or thiophene may be used also. Nitro derivatives, ethers and esters of the aromatic hydrocarbons are also suitable.

Examples of alkylene oxides are ethylene oxide, trimethylene oxide, propylene oxide, isobutylene oxide and the like. Substances which form alkylene oxides by elimination of hydrochloric or hydrobromic acid, as for example, ethylene chlorhydrin and propylene bromhydrin, may also be used.

Examples of metal halides which may be used are anhydrous aluminum halides, such as aluminum chloride and aluminum bromide, anhydrous ferric chloride and boron fluoride.

It is an object of the present invention to increase the percentage yield of the aromatic alcohols produced by such reaction, based on the amount of alkalene oxide used, by employing a large excess of Friedel-Crafts reactant over the alkylene oxide and over the anhydrous metal halide. The reason for the use of such excess is that any unreacted Friedel-Crafts reactant can be recovered unchanged, whereas any alkylene oxide which does not undergo the desired condensation with Friedel-Crafts reactant cannot be recovered since it is polymerized to worthless water-soluble by-products. For this reason it is desirable to use such reaction conditions that the maximum amount of alkylene oxide will undergo the desired Friedel-Crafts condensation. This is achieved by using a large excess of Friedel-Crafts reactant for the following reason: When a molecule of alkylene oxide comes into contact with the metal halide in the presence of a Friedel-Crafts reactant it can either condense with a molecule of Friedel-Crafts reactant to give an aromatic alcohol or it can condense with another molecule of alkylene oxide to give worthless by-products. The greater the number of molecules of Friedel-Crafts reactant that surround a molecule of alkylene oxide at the time of its coming into contact with the metal halide, the greater will be the ratio of the amount of aromatic alcohol formed to the amount of polymerized alkylene oxide formed.

For example, in the preparation of phenyl ethyl alcohol employing 150 lbs. of ethylene oxide and 455 lbs. of aluminum chloride, when the total amount of benzol used is 4000 lbs. so that the molar ratio of benzol to ethylene oxide is approximately 15:1, the yield of phenyl ethyl alcohol will be approximately 160 lbs. By increasing the total amount of benzol to 6000 lbs. in this reaction so that the molar ratio becomes 23:1 the yield of phenyl ethyl alcohol becomes approximately 200 lbs. and by employing 8000 lbs. of benzol so that the said ratio is 30:1, the yield of phenyl ethyl alcohol becomes approximately 225 lbs.

The efficacy of the process of the present invention will be apparent by contrasting the yields obtained by using a large excess of reactant as above pointed out with yields obtained when using only the amount of reactant required to provide a reaction mass which is sufficiently thin for good stirring. If in the examples above described only 1000 lbs. of benzol were used, so that the molar ratio of benzol to ethylene oxide would be only approximately 4:1, the yield of phenyl ethyl alcohol would be only approximately 100 lbs.

It will be apparent from the above that the greater the molar ratio of Friedel-Crafts reactant to alkylene oxide the greater the yield of aromatic alcohol. It will be understood, of course, that beyond a certain dilution ratio further increase in the amount of Friedel-Crafts reactant to the amount of alkaline oxide used will have an increasingly smaller effect toward increasing the yield. Another factor that must be taken into consideration in determining the amount of excess to be employed in any given case, is the fact that a small percentage of Friedel-Crafts reactant is always lost mechanically. When the ratio of Friedel-Crafts reactant to alkylene oxide becomes large enough, the cost of the small percentage of Friedel-Crafts reactant loss becomes greater than the saving on alkylene oxide which it accomplishes. Also for a certain size still an increase in the amount of dilution diminishes the yield per batch, so that the labor and expense per pound increases beyond that saved by increased yield. For the above and like reasons which will be readily understood by those versed in the art, there is an optimum dilution ratio for each reaction. This ratio has been found to lie between approximately 10:1 to approximately 40:1. Experience has shown that in the manufacture of phenyl ethyl alcohol the optimum ratio is in the neighborhood of 30:1.

In the manufacture of tolyl ethyl alcohol the ratio is also substantially 30:1 for the reason that the cost of toluol is approximately the same as that of benzol. In the case of the manufacture of hydratropyl alcohol using propylene oxide and benzol, the higher cost of propylene oxide as compared to ethylene oxide makes a greater dilution ratio more satisfactory, so that 40 moles of benzol may economically be employed per mole of propylene oxide. Conversely when making methoxy phenyl ethyl alcohol from anisole and ethylene oxide the higher cost of anisole renders the reaction more economical when a 20:1 dilution ratio is employed.

Since the main object of the invention is to have a large number of molecules of Friedel-Crafts reactant per molecule of alkylene oxide during the reaction, it is possible to achieve this by varying the amount of Friedel-Crafts reactant used to dissolve the alkylene oxide and the amount used to suspend the anhydrous metal halide, as long as the total amount of Friedel-Crafts reactant constitutes a large excess over the total amount of alkylene oxide. For example in the synthetic production of beta phenyl-ethyl alcohol the same yield is obtained when 16½ lbs. of ethylene oxide dissolved in 240 lbs. of dried benzol is added to 50 lbs. of anhydrous aluminum chloride suspended in 120 lbs. of dried benzol, as when 16½ lbs. of ethylene oxide dissolved in 120 lbs. dried benzol are added to 50 lbs. of anhydrous aluminum chloride suspended in 240 lbs. of dried benzol.

A further object of the present invention is concerned with such Friedel-Crafts reactions in which the Friedel-Crafts reactant is a solid at the temperature of the reaction. In such case it is proposed by the present invention to again increase the ratio of Friedel-Crafts reactant to alkylene oxide for the purpose of obtaining the maximum yield of alcohol from the alkylene oxide. In order to carry out the reaction it is necessary to form a suspension of anhydrous metal halide in Friedel-Crafts reactant and also to form a solution of alkylene oxide in another portion of Friedel-Crafts reactant. In order to accomplish this in cases where the Friedel-Crafts reactant is a solid, a solvent must be added to the Friedel-Crafts reactant so that the mixture will be a liquid at the temperature of the reaction. It has been customary to use an inert solvent such as petrolic ether or carbon bisulphide to accomplish this purpose. A molecule of the alkylene oxide, on entering the suspension, will come into contact either with a molecule of Friedel-Crafts reactant, in which case it will condense to form an aromatic alcohol, or it will come into contact with a molecule of inert solvent in which case no reaction will take place. This molecule of alkylene oxide will stay in the solution until it finally comes into contact either with a molecule of Friedel-Crafts reactant or with another molecule of alkylene oxide. In the former case the desired aromatic alcohol will be formed; in the latter case the alkylene oxide will be polymerized. Thus a portion of the alkylene oxide will be lost in the form of worthless by-products. Since it is the object of the present invention to utilize the maximum amount of alkylene oxide for the formation of aromatic alcohols, the inert solvents previously employed are replaced by liquid Friedel-Crafts reactants which serve the same purpose of rendering the reaction mass liquid at the temperature of the reaction. Here, however, the alkylene oxide on entering the suspension of anhydrous metal halide can come into contact with nothing but Friedel-Crafts reactant and, therefore, is condensed exclusively to form aromatic alcohol since it does not remain in the solution as before until polymerized. It is true that the product obtained consists now of a mixture of two aromatic alcohols, since two different Friedel-Crafts reactants are present in the reaction zone; however, by properly selecting a liquid Friedel-Crafts reactant it is possible to obtain two alcohols which vary sufficiently in boiling point to be easily separated by fractional distillation.

Any Friedel-Crafts reactant which on mixing with the solid Friedel-Crafts reactant which it is desired to condense renders the reaction mass liquid at the temperature of the reaction may be used as a diluent in the Friedel-Crafts condensation. It is desirable to employ liquid Friedel-Crafts reactants which are as unreactive as possible, so that the maximum amount of alkylene oxide will react with the solid Friedel-Crafts reactant, since that is essentially the main purpose of the reaction. Furthermore the Friedel-Crafts reactant employed as a diluent should give an alcohol which can be easily separated from the alcohol obtained from the solid Friedel-Crafts reactants, and since the latter alcohols are in general high boiling, it is best to employ a diluent giving a low boiling alcohol. For both of the above two reasons benzol is the most satisfactory diluent that can be employed, firstly since it gives the lowest boiling aromatic alcohol that can be obtained by this reaction, namely, phenyl-ethyl alcohol, and secondly, because it is the least reactive of the Friedel-Crafts reactants that have been studied. An example of this process of the present invention is as follows: To 320 grams of diphenyl oxide dissolved in 960 grams of anhydrous benzol add 267 grams of anhydrous aluminum chloride with stirring and cooling between 5 and 10° C. To this suspension add with stirring at 5 to 10° C., a solution of 88 grams of ethyleneoxide in 640 grams of diphenyl oxide. The reaction mass is poured onto an excess of ice-water and the oil layer distilled to remove the unreacted benzol. The residue is distilled under vacuum, 880 grams of a mixture of phenylethyl alcohol and diphenyl oxide being obtained at 90 to 110° C., at 4 millimeters. The phenoxy-phenylethyl alcohol then distill at 164 to 165° C., at one millimeter. The yield of phenoxy-phenylethyl alcohol equals 90 grams. The phenylethyl alcohol is separated from the unreacted diphenyl oxide by converting it into the phthalic ester and distilling off the diphenyl oxide under vacuum.

The diphenyl oxide may be used over again. Approximately 35 grams of phenylethyl alcohol is thus obtained.

By substituting 116 grams of propyyene oxide for the 88 grams of ethylene oxide used in the above example, 100 grams phenoxy-hydratropyl alcohol is obtained.

By substituting an equal weight of naphthylmethyl ether for the diphenyl ether used in the said example, 30 grams of phenyl-ethyl alcohol, and 90 grams of methoxy naphthyl ethyl alcohol are obtained.

By substituting an equal weight of naphthyl ethyl ether for diphenyl ether and 116 grams of propylene oxide for the 88 grams of ethylene oxide in the said example, 75 grams of methyl ethoxy naphthyl ethyl alcohol is obtained, along with 30 grams of phenyl ethyl alcohol.

A further example of the process of the present invention is the following:

To 100 lbs. of naphthalene dissolved in 100 lbs. of benzol is added with stirring at 8 to 12 degrees centigrade 13½ lbs. anhydrous aluminum chloride. To this suspension is added with stirring at the above temperature, a solution of 4 lbs. 7 oz. ethylene oxide in 50 lbs. of benzol. The reaction mass is decomposed by pouring it onto a large amount of ice and water, the oil layer is separated, washed neutral and the benzol recovered. The cold residue is centrifuged to separate the liquid reaction product from the unchanged naphthalene and the liquid is then vacuum distilled giving a mixture of phenyl ethyl alcohol and naphthyl ethyl alcohol which are separated by fractional distillation, giving about 1 lb. phenyl ethyl alcohol and 5 lbs. naphthyl ethyl alcohol.

I have described what I believe to be the best methods of practicing my invention. I do not wish, however, to be confined to the methods described, but what I desire to cover by Letters Patent is set forth in the appended claims.

I claim:

1. In a Friedel-Crafts reaction in which alkylene oxide is condensed with a Friedel-Crafts reactant, and in which the Friedel-Crafts reactant is a solid at the temperature of the reaction, the method of increasing the ratio of the amount of alkylene oxide which reacts to form alcohols, to the total amount thereof used in the reaction, which consists in employing a second Friedel-Crafts reactant as a diluent for making the reaction mass liquid at the temperature of the reaction, and thus obtaining a mixture of two alcohols, and then separating these alcohols.

2. In the process for the synthetic production of alcohols by the Friedel-Crafts reaction, in which the Friedel-Crafts reactant is such that a suspension of metal halide in the reactant would form a solid mass at the temperature of the reaction and in which the reagent which is to be condensed with the Friedel-Crafts reactant is of a nature such that it undergoes polymerization when it comes into contact with the metal halide employed in the reaction, the improvement which consists in diluting the Friedel-Crafts reactant with a second Friedel-Crafts reactant in such quantity as to make the reaction mass obtained by the addition of the metal halide to the mixture of Friedel-Crafts reactants liquid at the temperature of the reaction, so that the reagent which is to be condensed with the Friedel-Crafts reactants will have increased opportunity of coming into contact with Friedel-Crafts reactant and thus lessened opportunity to polymerize.

3. In the process for the synthetic production of alcohols by the Friedel-Crafts reaction in which an alkylene oxide is condensed with a Friedel-Crafts reactant in the presence of an anhydrous metal halide, and in which the Friedel-Crafts reactant is such that a suspension of metal halide in the reactant would form a solid mass at the temperature of the reaction, the improvement which consists in supplying a second Friedel-Crafts reactant to the reaction mass in such quantity as to make the said reaction mass liquid at the temperature of the reaction.

4. The process for the synthetic production of phenoxy-phenylethyl alcohol, which consists in dissolving diphenyl oxide in anhydrous benzol, suspending in the solution thus formed anhydrous aluminum chloride, introducing ethyleneoxide into this suspension so as to form both phenoxy-phenylethyl alcohol and phenylethyl alcohol, and then isolating the said alcohols.

5. The process for the synthetic production of phenoxy-phenylethyl alcohol which consists in forming a reaction mass consisting of diphenyl oxide, anhydrous benzol, anhydrous aluminum chloride and ethylene oxide, the quantity of benzol being sufficient to keep the reaction mass liquid during the course of the reaction, and then isolating the phenoxy-phenylethyl alcohol and the phenylethyl alcohol from the reaction mass.

6. The process for the synthetic production of aromatic alcohols which consists in forming a reaction mass consisting of Friedel-Crafts reactant, which would normally produce a solid reaction mass, a second Friedel-Crafts reactant which normally produces a liquid reaction mass, an anhydrous metal halide and an alkylene oxide, the quantity of the second Friedel-Crafts reactant being sufficient to keep the reaction mass liquid during the course of the reaction, and then isolating the alcohols formed, from the reaction mass.

ERNST T. THEIMER.